US012491899B2

(12) United States Patent
Oh

(10) Patent No.: US 12,491,899 B2
(45) Date of Patent: Dec. 9, 2025

(54) DRIVING CONTROL SYSTEM AND METHOD FOR ELECTRIC VEHICLE

(71) Applicants: Hyundai Motor Company, Seoul (KR); Kia Corporation, Seoul (KR)

(72) Inventor: Jiwon Oh, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 29 days.

(21) Appl. No.: 18/680,243

(22) Filed: May 31, 2024

(65) Prior Publication Data

US 2025/0206325 A1    Jun. 26, 2025

(30) Foreign Application Priority Data

Dec. 21, 2023    (KR) .......................... 10-2023-0187830

(51) Int. Cl.
*B60W 50/10*    (2012.01)
*B60W 10/08*    (2006.01)
*B60W 10/184*   (2012.01)
*B60W 40/072*   (2012.01)

(52) U.S. Cl.
CPC ............ *B60W 50/10* (2013.01); *B60W 10/08* (2013.01); *B60W 10/184* (2013.01); *B60W 40/072* (2013.01); *B60W 2520/14* (2013.01); *B60W 2540/18* (2013.01); *B60W 2710/083* (2013.01); *B60W 2710/18* (2013.01); *B60W 2720/26* (2013.01)

(58) Field of Classification Search
CPC .... B60W 50/10; B60W 10/08; B60W 10/184; B60W 40/072; B60W 2520/14; B60W 2540/18
See application file for complete search history.

(56) References Cited

U.S. PATENT DOCUMENTS

| 5,915,800 | A  | * | 6/1999  | Hiwatashi | ............. | B60T 8/1755 |
|           |    |   |         |           |               | 303/146     |
| 11,352,015 | B2 | * | 6/2022  | Collins   | ................. | B60K 6/547  |
| 11,584,224 | B2 | * | 2/2023  | O'Rourke  | ............ | B60K 17/356 |
| 2007/0227789 | A1 | * | 10/2007 | Imura     | ...................... | B60K 6/44 |
|           |    |   |         |           |               | 180/65.235 |
| 2018/0257631 | A1 | * | 9/2018  | Fodor     | ................... | B60W 10/18 |
| 2019/0152454 | A1 | * | 5/2019  | Watanabe  | ....... | B60W 30/18145 |

(Continued)

*Primary Examiner* — George C Jin
(74) *Attorney, Agent, or Firm* — Slater Matsil, LLP

(57) ABSTRACT

A driving control system and method for electric vehicles that may expand the countersteer effect through a software method of controlling driving force or braking force applied to wheels of a vehicle depending on a driver's intention and needs, can include a control unit that performs countersteer expansion control to increase the countersteer effect with respect to a driver's countersteer amount, determine whether or not a driving state of the vehicle is a countersteer situation based on vehicle driving information including information detected by a driving information detector, determine a countersteer index, and perform the countersteer expansion control configured to control driving force or braking force applied to wheels to increase the countersteer effect, when the determined countersteer index satisfies an expansion requirement after determining that the current driving state of the vehicle is the countersteer situation.

20 Claims, 11 Drawing Sheets

(56) References Cited

U.S. PATENT DOCUMENTS

| | | | |
|---|---|---|---|
| 2019/0176801 A1* | 6/2019 | Ruybal | B60K 6/52 |
| 2020/0324649 A1* | 10/2020 | Gully | B60K 17/356 |
| 2023/0166741 A1* | 6/2023 | Ga | B60W 30/188 |
| | | | 701/1 |
| 2024/0166216 A1* | 5/2024 | Park | B60W 40/13 |

* cited by examiner

DRIVING CONTROL SYSTEM AND METHOD FOR ELECTRIC VEHICLE

CROSS-REFERENCE TO RELATED APPLICATIONS

This application claims the benefit of Korean Patent Application No. 10-2023-0187830, filed on Dec. 21, 2023, which application is hereby incorporated herein by reference.

TECHNICAL FIELD

The present disclosure relates to a driving control system and method for electric vehicles.

BACKGROUND

Today, the electric vehicle market is gradually expanding. As most items, such as responsiveness, fuel efficiency, exhaust gas regulation, and the like, acting as technical problems in internal combustion engines, are solved in electric vehicles, the possibility of developing various new technologies has opened up. Therefore, breaking away from the development paradigm of internal combustion engine vehicles, whether or not unique selling points (USP) are secured through expanded functions, is emerging as the biggest factor in competitiveness of electric vehicles in the electric vehicle market in the future.

A drift mode is a driving mode in which a driving force control strategy may ensure stability of vehicle behavior, based on a driver's request, has rear wheel slip control intervention stopped in a state in which a limited slip differential for rear wheels is engaged and driving force is applied only to rear wheels so as to allow the driver to freely perform drift driving. Particularly, a drift mode is being developed as a representative USP using the characteristics of electric vehicles having a high degree of freedom in driving force control.

The drift mode is a known technology in electric vehicles. The corresponding technology includes a strategy that provides a driver with an environment in which it is easy to generate rear wheel slip through a method of stopping tire slip control intervention and engaging an electronic limited slip differential (e-LSD) simultaneously with generating driving force only from a rear wheel motor, in the case of an all-wheel drive (AWD) vehicle. Further, in the case of a rear wheel drive (RWD) vehicle, the drift mode is implemented through a method of stopping tire slip control intervention and engaging an electronic limited slip differential (e-LSD).

According to known technologies, rear wheel slip may readily occur during execution of the drift mode alone. However, it may not be easy to control the amplitude of occurrence of rear wheel slip to the extent desired by a driver, because torque response of a motor is very fast and a torque generation range is very wide due to the nature of electric vehicles.

Considering the above background, it may be seen that it is very important to ensure ease of controlling an oversteer amount to maintain the drift state without impairing ease of drift control. If torque is generated regardless of a driver's intention, ease of drift control may be impaired.

In addition, a conventional method used to increase the effect of countersteer in the drift mode is to expand a steering angle by attaching a steering angle adapter between a steering knuckle and a tie rod. However, this method has a disadvantage of affecting suspension stability and overall balance of a vehicle, and is not suitable for general driving.

The above information disclosed in this Background section is only for enhancement of understanding of the background of the present disclosure and therefore it may contain information that does not form the prior art that is already publicly known, available, or in use.

SUMMARY

The present disclosure relates to a driving control system and method for electric vehicles that may expand the countersteer effect only through a software method of controlling driving force or braking force applied to wheels of a vehicle depending on a driver's intention and needs.

Some embodiments of the present disclosure can solve the above-described problems associated with the prior art, and can provide a countersteer expansion control method that may amplify and expand the countersteer effect in conjunction with steering angle information while countersteering during execution of the drift mode.

Some embodiments of the present disclosure can provide a driving control system and method for electric vehicles that may expand the countersteer effect only through a software method of controlling driving force or braking force applied to wheels of a vehicle depending on a driver's intention and needs.

The advantages accomplished by some embodiments of the present disclosure are not limited to the above-mentioned advantages, and other advantages not mentioned herein also can be solve by some embodiments of the present disclosure, which can be understood by one of ordinary skill in the art (hereinafter referred to as "those skilled in the art") in the technical field to which the present disclosure pertains from the following description.

An embodiment of the present disclosure can provide a driving control method for electric vehicles, which can include determining, by a control unit, whether or not a driving state of a vehicle is a countersteer situation based on vehicle driving information collected from the vehicle, and determining a countersteer index configured to indicate a degree to which a countersteer effect with respect to a driver's countersteer amount to be increased, and performing, by the control unit, countersteer expansion control to increase the countersteer effect, when the determined countersteer index satisfies a predetermined expansion requirement upon determining that the driving state of the vehicle is the countersteer situation, where the countersteer expansion control is control of driving force or braking force applied to wheels of the vehicle.

An embodiment of the present disclosure can provide a driving control system for electric vehicles, which can include a driving information detector configured to detect information configured to indicate a driving state of a vehicle, and a control unit configured to perform countersteer expansion control to increase a countersteer effect with respect to a driver's countersteer amount, where the control unit determines whether or not the driving state of the vehicle is a countersteer situation based on vehicle driving information including the information detected by the driving information detector, determines a countersteer index configured to indicate a degree to which the countersteer effect with respect to the driver's countersteer amount to be increased, and performs the countersteer expansion control configured to control driving force or braking force applied to wheels of the vehicle to increase the countersteer effect, when the determined countersteer index satisfies a predetermined expansion requirement upon determining that the current driving state of the vehicle is the countersteer situation.

In an embodiment, the countersteer expansion control may be one of control configured to stop applying the driving force to rear wheels and control configured to reduce the driving force applied to the rear wheels.

In an embodiment, in the control configured to reduce the driving force applied to the rear wheels among the countersteer expansion control, the control unit may reduce the driving force applied to the rear wheels at a predetermined slope.

In an embodiment, the countersteer expansion control may be configured to resume rear wheel slip control configured to adjust the driving force of rear wheels of the vehicle so as to reduce rear wheel slip.

In an embodiment, the countersteer expansion control may be configured to apply a part of the driving force as much as a predetermined distribution ratio or all of the driving force to front wheels of the vehicle.

In an embodiment, the countersteer expansion control may be configured to apply one-sided braking force to turning outer wheels among front wheels and rear wheels of the vehicle turning along a curved road.

In an embodiment, the countersteer expansion control may be configured to apply one-sided braking force to a turning outer wheel among rear wheels of the vehicle turning along a curved road.

In an embodiment, the countersteer expansion control may include one of torque vectoring control configured to apply the driving force only to a turning inner wheel among front wheels of the vehicle turning along a curved road, torque vectoring control configured to reduce the driving force of a turning outer wheel among rear wheels of the vehicle compared to the driving force of a turning inner wheel among the rear wheels through a change in a torque distribution ratio between left wheels and right wheels of the vehicle turning along the curved road, to reduce the driving force of the turning outer wheel among the rear wheels compared to in a previous control cycle, or to perform slip limit control only on the turning outer wheel among the rear wheels, and torque vectoring control configured to reduce the driving force of the turning inner wheel among the rear wheels compared to the driving force of the turning outer wheel among the rear wheels through the change in the torque distribution ratio between the left wheels and the right wheels of the vehicle turning along the curved road, to reduce the driving force of the turning inner wheel among the rear wheels compared to in the previous control cycle, or to perform slip limit control only on the turning inner wheel among the rear wheels.

In an embodiment, the control unit may determine a steering direction of a steering wheel and a yaw rate direction of the vehicle from a steering angle and vehicle yaw rate information as the vehicle driving information, and may determine that the driving state of the vehicle is the countersteer situation when the steering direction and the yaw rate direction are opposite to each other.

In an embodiment, the predetermined expansion requirement may be set to a condition in which the countersteer index reaches a set maximum value or exceeds a set threshold.

In an embodiment, the countersteer index may be determined from set data by the control unit, the set data may use a steering angle among the vehicle driving information as an essential input variable, and may use at least one of a target yaw rate determined from the steering angle, a measured yaw rate detected by a sensor, a yaw rate error that is a difference between the target yaw rate and the measured yaw rate, or a vehicle speed, as an additional input variable, and the countersteer index may be set to a value corresponding to the input variables used.

In an embodiment, the countersteer index may be set to a larger value as, among the set data, an absolute value of the steering angle increases, an absolute value of the target yaw rate increases, an absolute value of the measured yaw rate increases, an absolute value of the yaw rate error increases, and the vehicle speed increases.

BRIEF DESCRIPTION OF THE DRAWINGS

The above and other features of the present disclosure will now be described in detail with reference to certain example embodiments thereof illustrated in the accompanying drawings, which are given hereinbelow by way of illustration only, and thus are not necessarily limitative of the present disclosure, and wherein.

Figure 1:
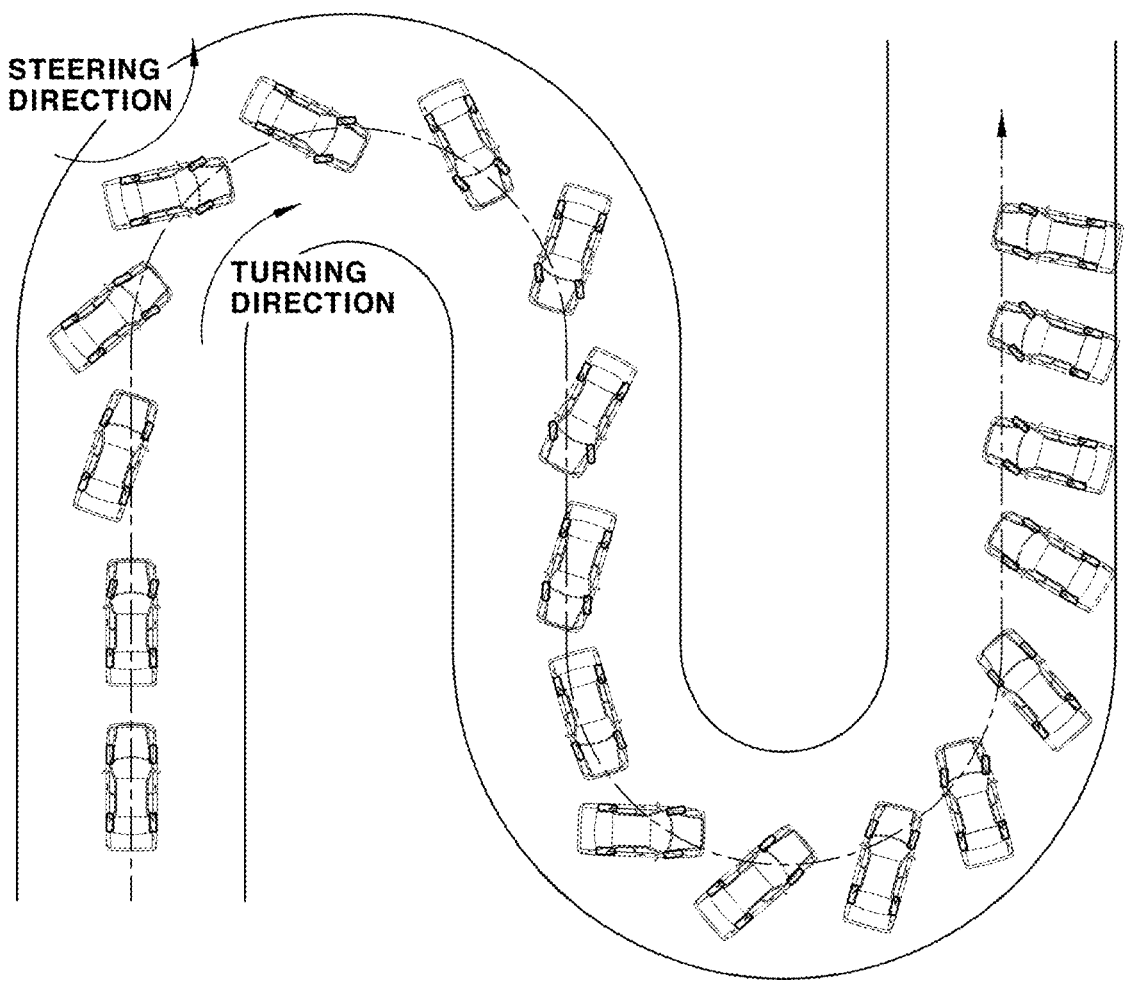
FIG. 1 is a diagram illustrating drift and countersteer states of a vehicle during turning, according to an embodiment of the present disclosure.

It can be understood that the appended drawings are not necessarily to scale, and can be presenting a somewhat simplified representation of various features illustrative of the present disclosure. The specific design features of the example embodiments of the present disclosure as disclosed herein, including, for example, specific dimensions, orientations, locations, and shapes, can be determined in part by the particular intended application and use environment.

In the figures, reference numbers can refer to the same or equivalent parts of the present disclosure throughout the several figures of the drawing.

DETAILED DESCRIPTION OF ILLUSTRATIVE EMBODIMENTS

Hereinafter reference will be made in detail to various example embodiments of the present disclosure, which are illustrated in the accompanying drawings and described below. Specific structural or functional descriptions in example embodiments of the present disclosure are set forth in the description that follows, and embodiments of the present disclosure may be embodied in many alternative forms. Further, it can be understood that the present disclosure may not be construed as being limited to the embodiments set forth herein, and the embodiments of the present disclosure are provided for a complete disclosure and cover modifications, equivalents, or alternatives that come within the scopes and technical ranges of the disclosure.

In the present disclosure, terms, such as "first" and "second", can be used to describe various elements, and such elements may not necessarily be limited by such terms. Such terms can be used merely to distinguish one element from other elements. For example, a first element described hereinafter may be termed a second element, and similarly, a second element described hereinafter may be termed a first element, without departing from scopes of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements can be interpreted in a like fashion, e.g., "between" versus "directly between," "adjacent" versus "directly adjacent," etc.

Wherever possible, same reference numbers will be used throughout the drawings to refer to same or like parts. Terminology used herein can be for the purpose of describing particular example embodiments only and is not necessarily intended to be limiting. As used herein, singular forms may be intended to include plural forms as well, unless the context clearly indicates otherwise. The terms "comprises," "comprising," "including," and "having" are inclusive and therefore specify the presence of stated features, integers, operations, operations, elements, components, and/or combinations thereof, but do not preclude the presence or addition of one or more other features, integers, operations, operations, elements, components, and/or combinations thereof.

FIG. 1 is a diagram illustrating drift and countersteer states of a vehicle during turning, and the countersteer state refers to a state in which a driver performs steering input so that the turning direction of the vehicle and the steering direction of a steering wheel are opposite to each other while turning along a curved road.

Drift can refer to a behavior of intentionally generating oversteer by reducing available lateral force of rear wheels compared to front wheels by changing only driving force or braking force of the rear wheels, and then maintaining a rear wheel slip angle as desired.

The rear wheel slip angle can be determined by combinations of factors, such as a vehicle speed, a steering angle, driving force acting on the rear wheels, and a rear wheel slip speed. A skilled driver may effectively adjust these factors to control the rear wheel slip angle and a progress path depending on a driver's own intention.

Generally, as the rear wheel slip angle increases, countersteer is performed to prevent divergence of the rear wheel slip angle, and the effect of countersteer acts in the opposite direction to the rear wheel slip angle to prevent divergence of the rear wheel slip angle.

This principle can be applied to reduce lateral force of the front wheels by the same amount as the reduced lateral force of the rear wheels through countersteer, thereby preventing any further yaw moment in the direction of increasing the rear wheel slip angle from being generated.

When the driver wants to maintain a high rear wheel slip angle, or the rear wheel slip angle unintentionally becomes too large in the case of an unskilled driver, additional divergence of the rear wheel slip angle may be prevented by performing countersteer until the lateral force of the front wheels is sufficiently lowered to the level of the lateral force of the rear wheels even when a high rear wheel slip angle occurs.

However, because there is a physical limit to mechanically increasing the steering angle due to the design of a vehicle steering system, sufficient countersteer input is not possible when the rear wheel slip angle has already become too large. In such situation, due to the above-described design limitation, spin out due to divergence of the slip angle of the vehicle is inevitable, which can be very dangerous.

Therefore, drivers who wish to professionally perform drift driving often modify the steering system of a vehicle so as to obtain a larger steering angle. For example, a steering angle adapter can be attached between a steering knuckle and a tie rod of the vehicle so as to increase the possible steering angle. However, as described above, this method can have a disadvantage of affecting suspension stability and overall balance of the vehicle, and is not always suitable for general driving.

Accordingly, some embodiments of the present disclosure can provide a "virtual steering angle adaptor" function and a "countersteer expansion" function that may increase and expand the countersteer effect using a software method during execution of the drift mode, without changing hardware, such as installation of a steering angle adaptor.

Because this is a software method, it can have advantages of being used selectively as needed and increasing the countersteer effect without impairing a driver's intention at all.

Because the most basic principle of countersteer is to reduce the lateral force of the front wheels in order not to generate an additional yaw moment in the direction of divergence of the rear wheel slip angle, an embodiment of the present disclosure may achieve the same effect as installation of a steering angle adaptor and execution of countersteer only by a software method of controlling driving force or braking force applied to vehicle wheels.

Figure 2:
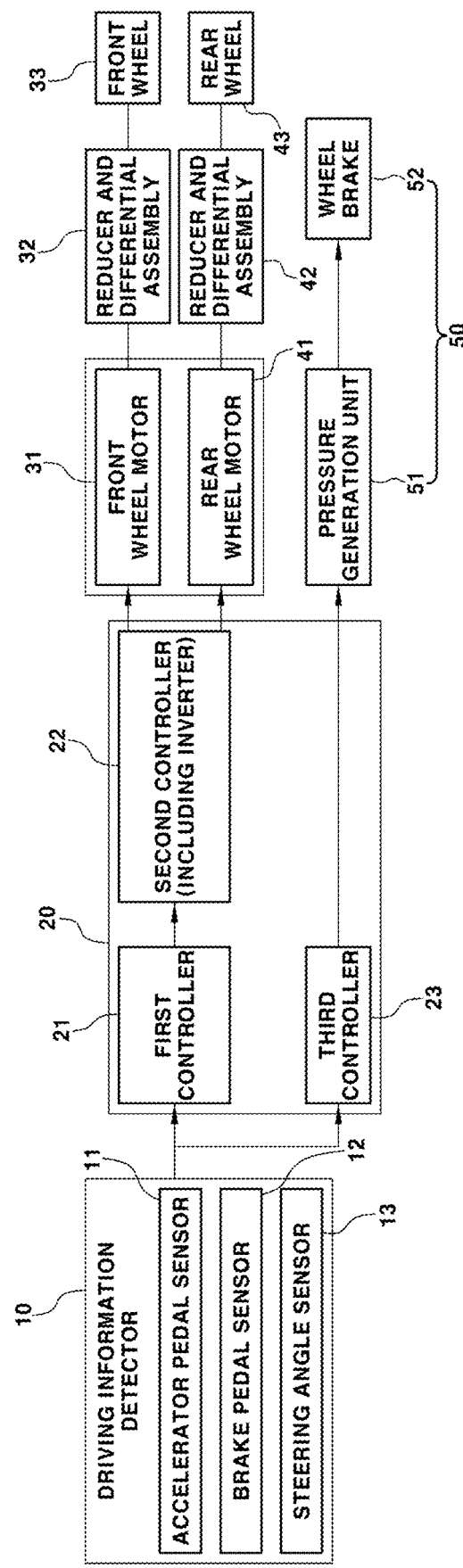
FIG. 2 is a block diagram showing a configuration of a system that performs a driving control process according to an embodiment of the present disclosure.

FIG. 2 is a block diagram showing a configuration of a system that can perform a driving control process according to an embodiment of the present disclosure. The configuration of the illustrated system will be described first as follows.

An embodiment of the present disclosure may be applied to a vehicle in which front wheels 33 and rear wheels 43 are driven by independent drive devices, respectively. Concretely, an embodiment of the present disclosure may be applied to a vehicle equipped with a front wheel drive device configured to apply torque to the front wheels 33 and a rear wheel drive device configured to apply torque to the rear wheels 43. The front wheels 33 and the rear wheels 43 are driving wheels respectively connected to the drive devices so that power may be transmitted to the front wheels 33 and the rear wheels 43 from the respective drive devices.

Further, an embodiment of the present disclosure may be applied to a vehicle in which both a front wheel drive device and a rear wheel drive device are motors. In the following description, a motor 31 corresponding to the front drive device will be referred to as "a front wheel motor", and a motor 41 corresponding to the rear drive device will be referred to as "a rear wheel motor".

Referring to FIG. 2, the front wheel motor 31 can be connected to the front wheels 33 through a reducer and differential assembly 32 so as to transmit power to the front wheels 33, and the rear wheel motor 41 can be connected to the rear wheels 43 through a reducer and differential assembly 42 so as to transmit power to the rear wheels 43.

In an embodiment of the present disclosure, driving torque and a driving torque command can be torque and a torque command in a vehicle acceleration direction or in a motor driving direction, and may be defined as torque and a torque command having a positive (+) value or indicating a positive (+) direction. On the other hand, braking torque and a braking torque command can be torque and a torque command in a vehicle deceleration direction, and may be defined as torque and a torque command having a negative (−) value or indicating a negative (−) direction.

Further, in the following description, a front wheel torque command and a rear wheel torque command, which can refer to a front axle torque command and a rear axle torque command, can indicate torque commands for the respective motors 31 and 41 configured to drive the vehicle (i.e., a front wheel motor torque command, which can be a torque command for the front wheel motor 31, and a rear wheel motor torque command, which can be a torque command for the rear wheel motor 41), and among motor torques, torque in the vehicle acceleration direction and torque in the motor driving direction can be torques in the positive (+) direction, i.e., torques having positive (+) values.

Further, braking torque can include regenerative braking torques generated by the front wheel motor 31 and the rear wheel motor 41 and frictional braking torques generated by a frictional braking device 50. The regenerative braking torques and the frictional braking torques can be torques in the vehicle deceleration direction, and can thus be torques in the negative (−) direction, i.e., torques having negative (−) values.

When the front wheel torque command and the rear wheel torque command, which can be torque commands for the motors 31 and 41, exhibit negative (−) torque values, these torque commands can be regenerative braking torque commands for the corresponding motors 31 and 41, and front wheel motor torque and rear wheel motor torque having the negative (−) values can be torques in the vehicle deceleration direction and a regeneration direction.

Further, when the front wheel torque command and the rear wheel torque command exhibit positive (+) torque values, these torque commands can be driving torque commands for the corresponding motors 31 and 41, and front wheel motor torque and rear wheel motor torque having the positive (+) values can be torques in the vehicle acceleration direction and the motor driving direction.

In addition, separately from the regenerative braking torque commands which can be the front wheel torque command and the rear wheel torque command having negative (−) torque values, frictional braking torque commands can be commands for controlling frictional braking of the vehicle, i.e., commands for the frictional braking device 50.

The frictional braking device 50 may independently apply braking force to the left wheels 33 and the right wheels 43 of the vehicle to enable left and right side braking of both the front wheels 33 and the rear wheels 43, and may be a hydraulic braking device. Torque depending on the frictional braking torque command can also be braking torque in the vehicle deceleration direction, and can be torque in the negative (−) direction, i.e., torque having a negative (−) value.

In an embodiment of the present disclosure, a drive system of the vehicle can include a front wheel side drive system and a rear wheel side drive system, and each of the front wheel side drive system and the rear wheel side drive system can include drive elements, such as a motor, driving wheels, a drive shaft between the motor and driving wheels, a reducer and differential assembly, an axle, and the like.

The front wheel side drive system can include the front wheel motor 31, the front wheels 33, a drive shaft (not shown) between the front wheel motor 31 and the front wheels 33, the reducer and the differential assembly 32, and an axle (not shown). The rear wheel side drive system can include the rear wheel motor 41, the rear wheels 43, a drive shaft (not shown) between the rear wheel motor 41 and the rear wheels 43, the reducer and the differential assembly 42, and an axle (not shown).

Accordingly, torques output by the front wheel motor 31 and the rear wheel motor 41 in the respective drive systems may be transmitted to the front wheels 33 and the rear wheels 43 through the drive elements, such as the drive shafts, the reducer and differential assemblies 32 and 42, the axles, and the like.

Further, although not shown in FIG. 2, a battery can be connected to the front wheel motor 31 and the rear wheel motor 41 via inverters so as to be rechargeable. The inverters may include a front wheel inverter (not shown) configured to drive and control the front wheel motor 31, and a rear wheel inverter (not shown) configured to drive and control the rear wheel motor 41.

In the electric vehicle, operation (driving or regeneration) of the front wheel motor 31 and the rear wheel motor 41 can be controlled depending on torque commands generated by a control unit 20. The control unit 20 can determine requested torque based on vehicle driving information acquired by a driving information detector 10, determine front wheel torque and rear wheel torque distributed from the requested torque, and generate and output respective motor torque commands, i.e., a front wheel torque command and a rear wheel torque command, using the front wheel torque and the rear wheel torque as command values.

Further, the control unit 20 can control operation of the front wheel motor 31 and the rear wheel motor 41 through the inverters based on the front wheel torque command and the rear wheel torque command. As described above, when command torques based on the front wheel torque command and the rear wheel torque command are torques in the positive (+) direction (torques having positive values), the front wheel torque command and the rear wheel torque command may be defined as driving torque commands, i.e., torque commands in the vehicle acceleration direction and the motor driving direction, and when the command torques based on the front wheel torque command and the rear wheel torque command are torques in the negative (−) direction (torques having negative values), the front wheel torque command and the rear wheel torque command may be defined as regenerative braking torque commands, i.e., torque commands in the vehicle deceleration direction and the regeneration direction.

The control unit 20 in an embodiment of the present disclosure may include a first controller 21 that determines requested torque required to drive the vehicle based on the vehicle driving information detected by the driving information detector 10, such as a driving input value input by a driver, or receives the requested torque from other control units, such as an Advanced Driver Assistance System (ADAS) control unit, and generates and outputs the front wheel torque command and the rear wheel torque command that are torque commands for the respective motors (or the respective axles) based on the requested torque, a second controller 22 that controls operation of the front wheel motor 31 and the rear wheel motor 41 depending on the front and rear wheel torque commands output by the first controller 21, and a third controller 23 that controls operation of the frictional braking device 50 through cooperative control with the first controller 21.

The first controller 21 may be a Vehicle Control Unit (VCU) that determines and generates a torque command required for vehicle driving in a general vehicle. A method of determining requested torque to drive a vehicle from vehicle driving information and determining torque commands to control torques of drive systems including motors and a process thereof are known in the art, and a detailed description thereof will thus be omitted.

When the first controller 21 outputs the front wheel torque command and the rear wheel torque command, the second controller 22 can receive the front and rear wheel torque commands and control operation of the front wheel motor 31 and the rear wheel motor 41 through the front wheel inverter and the rear wheel inverter.

Thereby, torque output by the front wheel motor 31 can be applied to the front wheels 33 through the reducer and differential assembly 32 of the front wheel side drive system, and torque output by the rear wheel motor 41 can be applied to the rear wheels 43 through the reducer and differential assembly 42 of the rear wheel side drive system.

The second controller 22 may be a general Motor Control Unit (MCU) that controls operation of a drive motor through an inverter depending on a torque command output by a Vehicle Control Unit in an electric vehicle.

In an embodiment of the present disclosure, the vehicle driving information, such as the driving input value input by the driver, to the control unit 20 can be information indicating a vehicle driving state, and may include sensor detection information detected by the driving information detector 10 and input to the control unit 20 through a vehicle network.

In an embodiment of the present disclosure, the driving information detector 10 may include an accelerator position sensor (APS) 11 that detects a driver's accelerator pedal input value (APS value, %), a brake pedal sensor 12 that detects a driver's brake pedal input value (BPS value, %), and a steering angle sensor (SAS) 13 that detects a steering angle depending on a steering wheel operation state among driver's steering input values.

In addition, the driving information detector 10 may include a yaw rate sensor (not shown) that detects a yaw rate of the vehicle, sensors (not shown) that detect speeds of the drive systems, and a sensor (not shown) that detects a vehicle speed.

The speeds of the drive systems may be rotational speeds of the front wheel motor 31 and the rear wheel motor 41 or rotational speeds of the driving wheels 33 and 43 (wheel speeds). The sensors that detect the speeds of the front wheel side drive system and the rear wheel side drive system may be sensors that detect rotational speeds of the respective motors 31 and 41, and the sensors may be general resolvers configured to detect positions of rotors of the motors 31 and 41. Also or otherwise, the sensors that detect the speeds of the front wheel side drive system and the rear wheel side drive system may be general wheel speed sensors configured to detect rotational speeds of the driving wheels 33 and 43 (i.e., the wheel speeds).

Further, the sensor that detects the vehicle speed may also be a wheel speed sensor. Acquisition of vehicle speed information from a signal from the wheel speed sensor is well known in the art, and a detailed description thereof will thus be omitted.

Further, as the vehicle driving information required for the control unit 20 to determine and generate the requested torque and the torque commands and to control driving force and braking force of the vehicle, the accelerator pedal input value (APS value, %), the brake pedal input value (BPS value, %), the steering angle, which is one of the driver's steering input information, a measured yaw rate, the rotational speeds of the motors 31 and 41, the rotational speeds of the driving wheels 33 and 43, the vehicle speed, and the like, which are detected by the driving information detector 10, may be selectively used.

Further, the vehicle driving information may include information determined by the control unit 20 by itself in a broad sense, and may further include information (for example, requested torque information) input to the control unit 20 from other control units (for example, the ADAS control unit) in the vehicle through the vehicle network.

In FIG. 2, a frictional braking device 50 may include a front wheel frictional braking device configured to apply frictional braking torque to the front wheels 33, and a rear wheel frictional braking device configured to apply frictional braking torque to the rear wheels 43.

The frictional braking device 50 may be a hydraulic braking device, the configuration of the hydraulic braking device is well known to those skilled in the art, and a detailed description thereof will thus be omitted.

Referring to FIG. 2, main components of the frictional braking device 50 can include a pressure generation unit 51 that generates controlled braking hydraulic pressure, and wheel brakes 52 for respective wheels that apply frictional braking force controlled by the braking hydraulic pressure generated and supplied by the pressure generation unit 51 to the corresponding wheels.

In addition, operation of the frictional braking device 50 can be controlled by the third controller 23. The third controller 23 can be a controller in charge of braking control of the vehicle, and control operation of the frictional braking device 50 depending on the frictional braking torque command.

The pressure generation unit 51 can generate the braking hydraulic pressure controlled depending on the frictional braking torque command output from the third controller 23, and thereby, the braking hydraulic pressure generated by the pressure generation unit 51 can be supplied to the wheel brakes 52, and braking force controlled by the wheel brakes 52 can be applied to the corresponding wheels.

In this way, operation of the frictional braking device 50 may be controlled depending on the frictional braking torque command output from the third controller 23, and thus, the controlled frictional braking force generated by the frictional braking device 50 may be applied to the wheels.

Although a control subject can be divided into the first controller 21, the second controller 22 and the third controller 23, as in the above description, the torque control and frictional braking control processes according to an embodiment of the present disclosure may be performed by one integrated control element in place of a plurality of controllers.

In an embodiment of the present disclosure, the above-described plurality of controllers and one integrated control element may be collectively referred to as the control unit 20, and the torque control and frictional braking control processes according to an embodiment of the present disclosure, which will be described below, may be executed by the control unit 20. In the following description, the first controller 21, the second controller 22 and the third controller 23 will be collectively referred to as the control unit 20.

Further, an embodiment of the present disclosure can be characterized in that, to generate a greater countersteer effect on a countersteer amount and a yaw rate generation amount by the driver during execution of the drift mode compared to a conventional countersteer method based on a front wheel steering angle, distribution of driving force to the front wheels 33 can be performed, rear wheel driving force can be reduced, tire slip control can be performed, or vectoring of driving force or braking force can be performed.

In a general drift mode, to effectively cause slip of the rear wheels 43, driving force control can be performed so that all driving force is concentrated on the rear wheels 43. When tire slip occurs on the rear wheels 43 during turning, the limit of lateral force that may be generated at the rear wheels 43 can be significantly reduced due to the characteristics of a tire friction source.

However, because driving force is not applied to the front wheels 33 in such scenario, the limit of lateral force which may be generated at the front wheels 33 is not necessarily reduced due to the characteristics of the tire friction source. Therefore, such a difference in friction characteristics between front tires and rear tires can lead to a difference between the magnitudes of the lateral force generated by the front tires and the rear tires, and can cause a yaw acceleration of the vehicle, thereby causing oversteer.

In a drift mode, the goal can be to perform drift driving by maintaining as much oversteer as the driver wants. This may be accomplished by reducing the lateral force of the front wheels in line with the reduction of the lateral force of the rear wheels through appropriate countersteer input by the driver.

The driver's countersteer input can refer to that the driver operates the steering wheel in a direction opposite to the turning direction of the vehicle, and can refer to a state in which the driver performs steering input so that the turning direction of the vehicle and the steering direction of the steering wheel are opposite to each other.

However, there are cases in which an excessive yaw acceleration occurs due to driver's inexperience in countersteer operation or road surface disturbance, and thus can result in excessive oversteer or an excessive rear wheel lateral slip angle. In such case, greater countersteer input can be required to immediately reduce the excessive rear wheel lateral slip angle.

However, in the case in which the rear wheel lateral slip angle is already excessive, a steering angle required to obtain a sufficiently large countersteer effect to reduce the excessive rear wheel lateral slip angle may exceed the maximum value of a steering angle range obtainable in the design of the vehicle. In such case, the rear wheel lateral slip angle can diverge and thus the vehicle spins beyond a steering limit (sometimes referred to a spinning out or breaking loose), and this state can be very dangerous and is thus undesirable.

To prevent the vehicle from spinning beyond an intended steering angle, it can be necessary to generate a large countersteer effect, but when the steering angle has already reached the maximum, it can be impossible to mechanically increase the countersteer effect using steering wheel input and steering.

Therefore, an embodiment of the present disclosure can provide a control method embodiment for virtual countersteer expansion that uses control of driving force and braking force to obtain a greater countersteer effect, and thereby, increases the countersteer effect based on driving force control or braking force control, as follows.

The following control method embodiment for virtual countersteer expansion may be performed by the control unit 20 during execution of the drift mode.

First Embodiment

The control unit 20 can determine whether or not the current driving state of the vehicle is a countersteer situation based on vehicle driving information collected from the vehicle, and determine a countersteer index in real time. The control unit 20 can determine whether or not the current driving state of the vehicle is the countersteer situation based on the steering angle detected by the steering angle sensor 13 and the yaw rate of the vehicle detected by the yaw rate sensor (not shown), i.e., the measured yaw rate.

The control unit 20 may determine the steering direction of the steering wheel by the driver and the turning direction (i.e., a yaw rate direction) of the vehicle from the detected real-time steering angle and yaw rate information, and may determine that the current driving state of the vehicle is the countersteer situation when the steering direction and the turning direction (i.e., the yaw rate direction) are opposite to each other.

In addition, the control unit 20 may be set to perform countersteer expansion control to increase the countersteer effect of the vehicle, when the countersteer index satisfies a predetermined expansion requirement when determining whether or not the current driving state of the vehicle is the countersteer situation. The predetermined expansion requirement may be set to a condition in which the countersteer index reaches a set maximum value or exceeds a set threshold.

As the countersteer expansion control, in the first embodiment, the control unit 20 may be set to stop applying driving force to the rear wheels 43 by the rear wheel motor 41 (stops generation of rear wheel driving force), or to reduce driving force applied to the rear wheels 43 by the rear wheel motor 41.

In the case of reducing the driving force applied to the rear wheels 43 by the rear wheel motor 41, the control unit 20 may be set to perform control that gradually reduces the driving force applied to the rear wheels 43 by the rear wheel motor 41 at a predetermined slope as a countersteer index value increases.

An amount of reduction in the rear wheel driving force may vary depending on the size of the countersteer index, and in this example case, the larger the countersteer index, the greater the amount of reduction in the rear wheel driving force.

Second Embodiment

The control unit 20 can determine whether or not the current driving state of the vehicle is the countersteer situation based on the vehicle driving information collected from the vehicle, and determine a countersteer index in real time.

The control unit 20 may be set to resume rear wheel slip control that adjusts driving force of the rear wheels 43 to reduce rear wheel slip, when the countersteer index reaches the set maximum value or exceeds the set threshold when determining whether or not the current driving state of the vehicle is the countersteer situation.

The control unit 20 may be set to gradually resume rear wheel slip control as the countersteer index increases. Rear wheel slip control through adjustment of the driving force of the rear wheels is a known technology in vehicle control, and a detailed description thereof will thus be omitted.

It may be understood that gradually resuming rear wheel slip control as the countersteer index increases can mean, for example, assuming that a state of fully using the exiting rear wheel slip control is defined as 1 and a state of completely disabling the rear wheel slip control function is defined as 0, 0 is maintained when the countersteer index has a low value, and as the countersteer index increases, the magnitude of the slip control function is increased up to 1.

When the countersteer index increases appropriately, the slip control function with a magnitude of approximately 0.5 may be applied, and this may mean that a torque correction amount of about half of the existing slip control on state may be applied.

Third Embodiment

The control unit 20 can determine whether or not the current driving state of the vehicle is the countersteer situation based on the vehicle driving information collected from the vehicle, and determine a countersteer index in real time.

The control unit 20 may be set to apply a part of driving force as much as a predetermined distribution ratio or the entirety of driving force to the front wheels 33, when the countersteer index reaches the set maximum value or exceeds the set threshold when determining whether or not the current driving state of the vehicle is the countersteer situation. Alternatively, the control unit 20 may be set to gradually increase the distribution ratio of the driving force to the front wheels 33 as the countersteer index increases.

Distribution of the driving force to the front wheels 33 can mean that driving force is generated by the front wheel motor 31 and is applied to the front wheels 33, and in the following description, distribution of the entirety of driving force to the front wheels 33 can mean that driving force is generated only by the front wheel motor 31 and is applied only to the front wheels 33 and generation of driving force by the rear wheel motor 41 and distribution of the driving force to the rear wheels 43 are stopped. In addition, in the following description, distribution of a part of driving force to the front wheels 33 can mean that at least a part of necessary driving force is generated by the front wheel motor 31 and is applied to the front wheels 33.

An amount of driving force applied to the front wheels 33 may vary depending on the size of the countersteer index, and in this example case, the larger the countersteer index, the greater the amount of the driving force distributed to the front wheels 33.

Fourth Embodiment

The control unit 20 can determine whether or not the current driving state of the vehicle is the countersteer situation based on the vehicle driving information collected from the vehicle, and determine a countersteer index in real time.

The control unit 20 may be set to resume vehicle stability control through application of one-sided braking force, when the countersteer index reaches the set maximum value or exceeds the set threshold when determining whether or not the current driving state of the vehicle is the countersteer situation. The control unit 20 may be set to gradually resume vehicle stability control through application of one-sided braking force as the countersteer index increases.

In control to apply one-sided braking force, the control unit 20 may perform control to apply one-sided braking force only to turning outer wheels among left and right wheels of both the front and rear wheels 33 and 43, or may perform control to apply one-sided braking force only to a turning outer wheel among the rear left and right wheels.

Application of one-sided braking force may be performed by controlling operation of the frictional braking device 50 by the control unit 20, and for this purpose, cooperative control between the first controller 21 and the third controller 23 may be performed.

In such example case, the larger the countersteer index, the greater the magnitude of the braking force applied to the turning outer wheels.

Fifth Embodiment

The control unit 20 can determine whether or not the current driving state of the vehicle is the countersteer situation based on the vehicle driving information collected from the vehicle, and determine a countersteer index in real time.

The control unit 20 may be set to resume vehicle stability control through torque vectoring, when the countersteer index reaches the set maximum value or exceeds the set threshold when determining whether or not the current driving state of the vehicle is the countersteer situation. The control unit 20 may be set to gradually resume vehicle stability control through torque vectoring as the countersteer index increases.

In such example case, the larger the countersteer index, the greater the amount of torque vectoring control.

In an embodiment of the present disclosure, the countersteer index may be determined from set data, such as a function or a map or lookup table that uses the steering angle detected by the steering angle sensor 13 as an essential input variable and uses at least one variable of a target yaw rate determined from the steering angle, a measured yaw rate that is a value detected by the yaw rate sensor, a yaw rate error (a difference between the target yaw rate and the measured yaw rate), or a vehicle speed, as an additional input variable, by the control unit 20.

Further, the countersteer index may be set to be valid only when the steering angle detected by the steering angle sensor 13 or the target yaw rate determined based on the steering angle is in a direction opposite to the measured yaw rate that is detected by the yaw rate sensor.

Further, in this situation in which the countersteer index is valid, the countersteer index may be set in the control unit 20 to a larger value as the absolute value of the steering angle or the absolute value of the target yaw rate determined from the steering angle increases. Additionally, in the situation in which the countersteer index is valid, the countersteer index may be set in the control unit 20 to a larger value as the absolute value of the yaw rate error increases and the vehicle speed increases. The map may be corrected so that, as the larger the vehicle speed, the larger countersteer index.

In addition, although it has been described above that the control unit 20 performs the controls for countersteer expansion according to the first to fifth embodiments when the countersteer index reaches the set maximum value or exceeds the set threshold when determining whether or not the current driving state of the vehicle is the countersteer situation, the control unit 20 may be set to gradually perform one selected from the controls for countersteer expansion according to the first to fifth embodiments as the countersteer index increases only when the countersteer index exceeds the set threshold when determining whether or not the current driving state of the vehicle is the countersteer situation. It is also possible to overlap and/or combine a plurality of methods from among the controls according to the first to fifth embodiments.

In addition, the control unit 20 may be set to simultaneously perform and overlap two or more selected from the controls for countersteer expansion according to the first to fifth embodiments, and may be set to selectively perform one or more selected from the controls for countersteer expansion according to the first to fifth embodiments depending on a driving mode set value by the driver.

The driver's driving mode set value can refer to a state which the driver sets so as to separately use the corresponding function. For example, in an audio, video and navigation (AVN) system having a function that allows the driver to select whether to use the countersteer expansion function, the driver may set the countersteer expansion function to an "enabled" status.

In addition, matters that the driver may select or set in relation to countersteer expansion may be collectively referred to driving mode set values. That is, the countersteer expansion function may be automatically applied only in a predetermined mode from among driving modes, including an eco-mode, a normal mode and a sport mode.

Alternatively, the countersteer expansion function may be selected in a custom mode in which among various functions in the vehicle, desired functions are set and combined to be selectively used, or the countersteer expansion function may be operated only at a specific level among vehicle body stability control levels.

One of the purposes of separately providing the drift mode can be to prevent vehicle behavior that is contrary to a driver's intention due to stability control or slip control, so that the driver may focus only on drift of the vehicle.

Therefore, according to the above-described virtual countersteer expansion control method proposed in the present disclosure, countersteer expansion control may be selectively performed depending on the steering angle, which is driver's steering input, and may thus expand a degree of driver freedom during countersteering without losing the original purpose of the drift mode, thereby being capable of providing a driving strategy that allows the driver to more easily perform drift driving.

In example embodiments of the present disclosure, use of the countersteer index to control countersteer expansion has been described. A driving control method for electric vehicles according to an embodiment the present disclosure includes performing control to expand countersteer using the countersteer index.

In an embodiment of the present disclosure, the countersteer index can indicate a degree to which the countersteer effect needs to be increased, can be used to determine a degree to which measures to expand the countersteer effect are taken, and may be obtained from set data input in advance to and stored for/in the control unit 20.

The set data can be provided so that the control unit 20 may determine the countersteer index from the vehicle driving information including the steering angle, and may be a function or a map, such as a formula defining the relations between the vehicle driving information and the countersteer index.

Specifically, the set data of the control unit 20 may be a function or a map, such as a formula in which the steering angle is an essential input variable, at least one of the target yaw rate, the measured yaw rate, the yaw rate error or the vehicle speed is an additional input variable, and the countersteer index is an output variable.

Equation 1 below shows one example of a formula to determine the countersteer index using the steering angle and the yaw rate as inputs.

$$\xi_{counter} = \frac{-100}{1 + e^{-(\delta \cdot r + 1400) \times 0.0036}} + 100 \qquad \text{[Equation 1]}$$

In Equation 1, $\xi_{counter}$ indicates the countersteer index (%), $\delta$ indicates the steering angle (%), and r indicates the yaw rate (deg/s).

Figure 3:
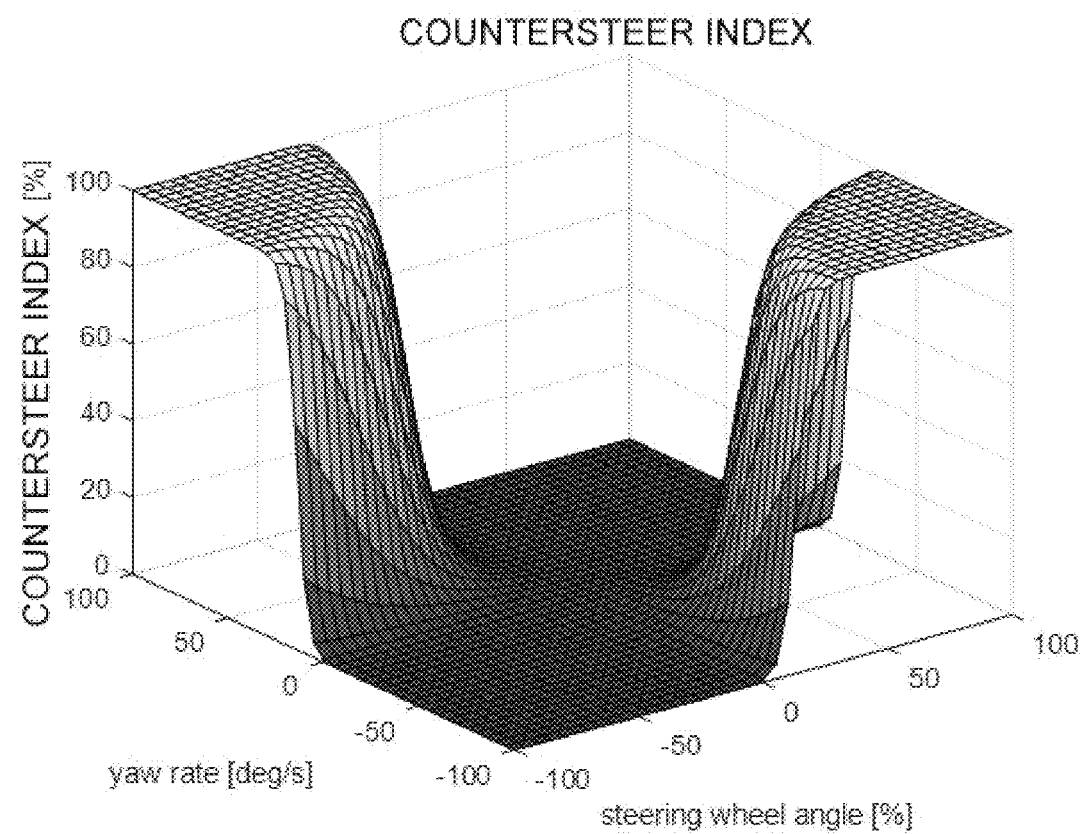
FIGS. 3 and 4 are diagrams showing examples of maps used to determine a countersteer index from vehicle driving information including a steering angle according to an embodiment of the present disclosure.
Figure 4:
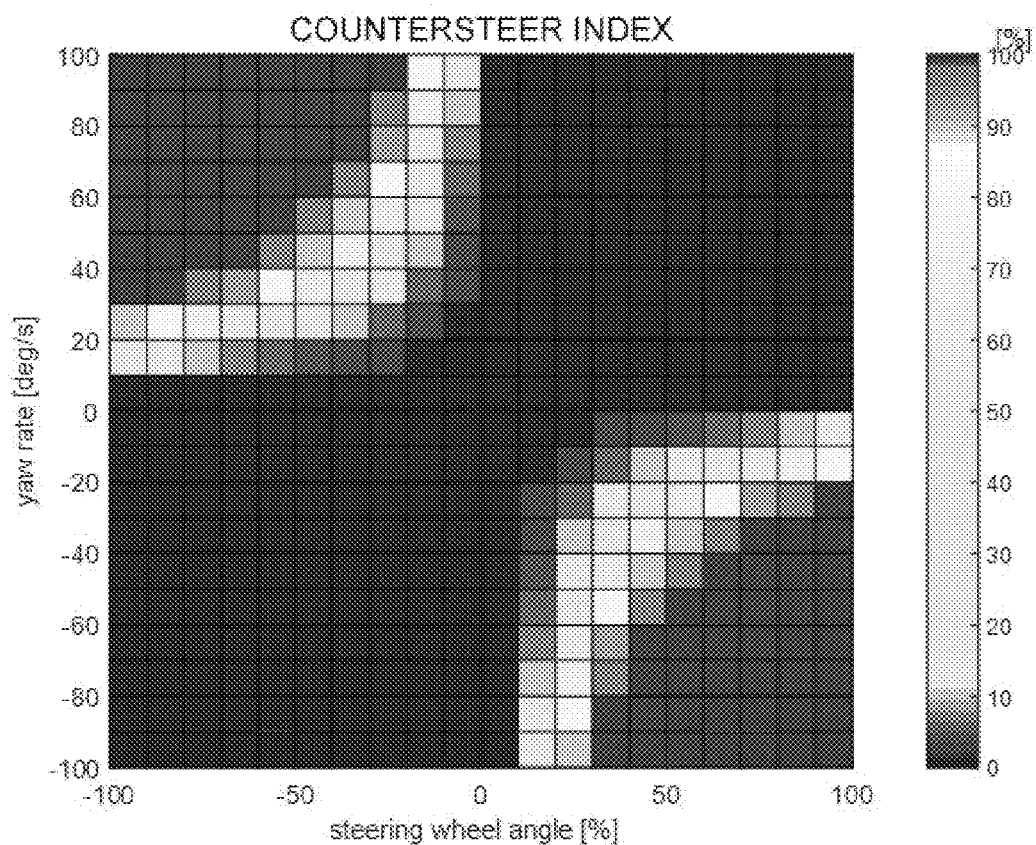

Further, FIGS. 3 and 4 are diagrams showing examples of maps that can be used to determine the countersteer index from the vehicle driving information including the steering angle according to an embodiment of the present disclosure. FIGS. 3 and 4 both show example maps set to determine the countersteer index using the steering angle and the yaw rate as inputs. As illustrated, each map can define the relations among the steering angle, the yaw rate, and the countersteer index.

Figure 5:
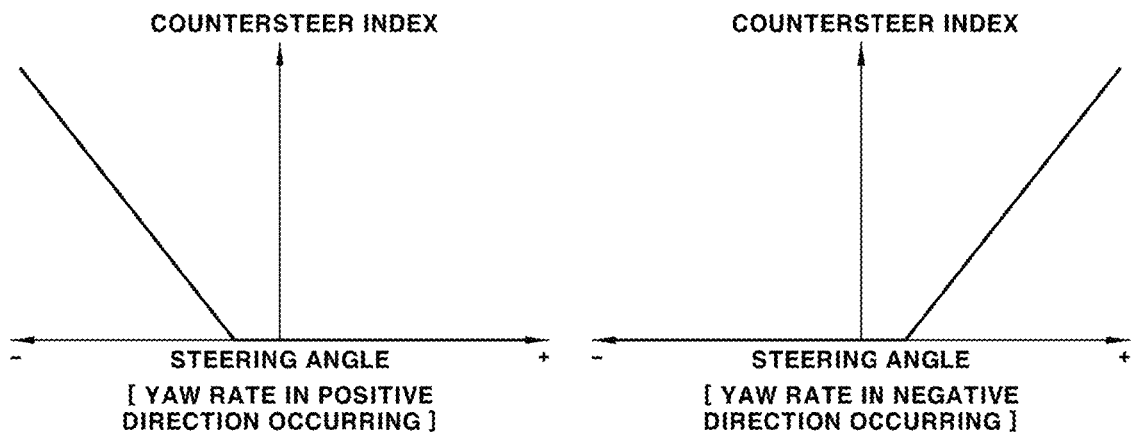
FIG. 5 is a diagram of an example showing relations among a steering angle, a yaw rate, and a countersteer index according to an embodiment of the present disclosure.

In addition, FIG. 5 is a diagram of another example showing relations among the steering angle, the yaw rate, and the countersteer index, according to an embodiment of the present disclosure, in which a left graph shows the countersteer index while a yaw rate in the positive (+) direction is occurring, and a right graph shows the countersteer index while a yaw rate in the negative (−) direction is occurring.

As can be seen in FIG. 5, the countersteer index may be set in the control unit 20 to a larger value as the absolute value of the steering angle increases. In the countersteer situation in which the direction of the yaw rate occurring in the drift mode and the steering direction of the steering wheel by the driver can be opposite to each other, assuming that the steering angle for countersteer may be insufficient, the countersteer index can increase as the steering angle increases.

Hereinafter, the countersteer expansion control state according to an embodiment of the present disclosure will be described in more detail.

Figure 6:
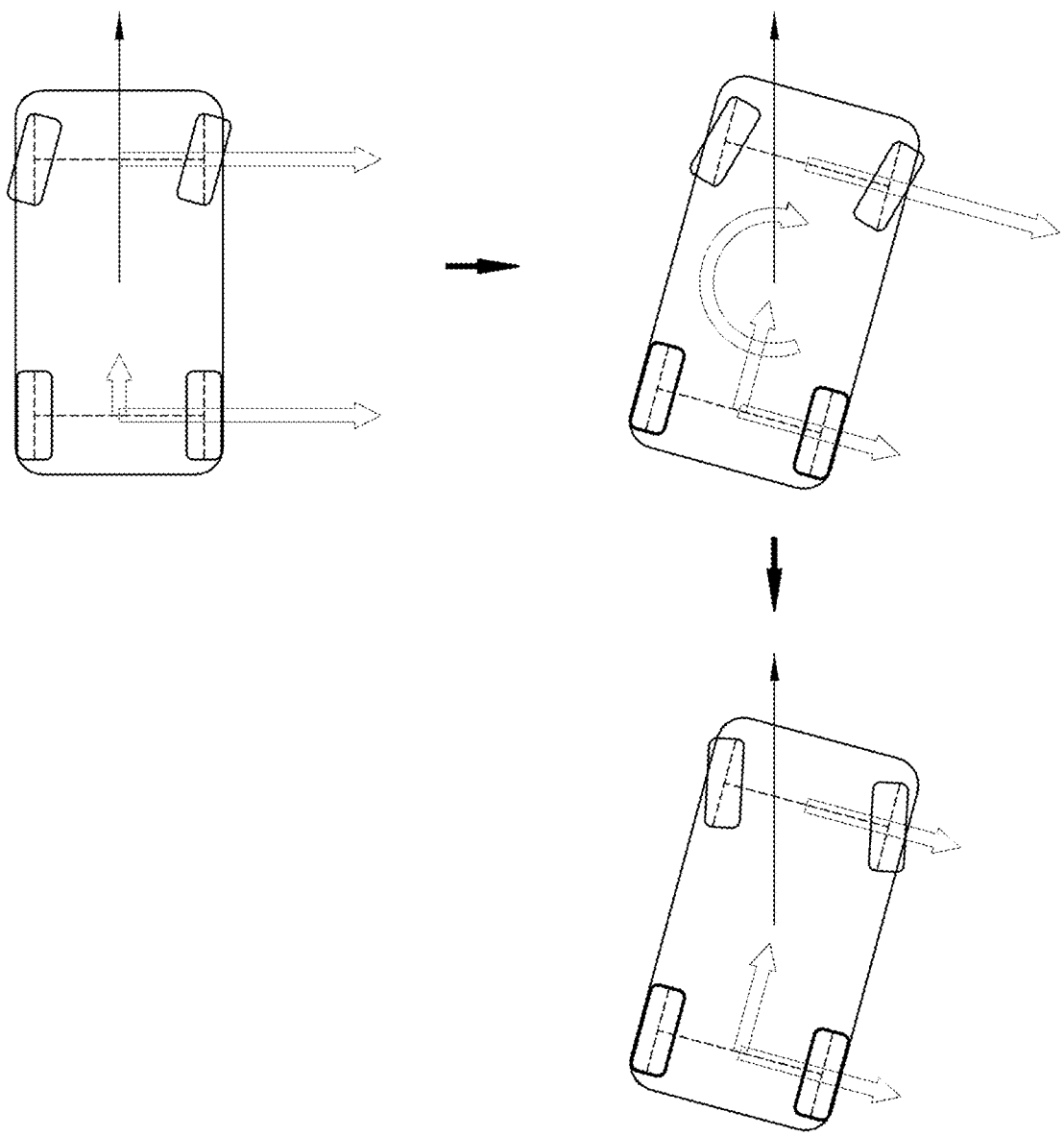
FIG. 6 is a diagram showing a case in which effective countersteering is performed according to an embodiment of the present disclosure.
Figure 7:
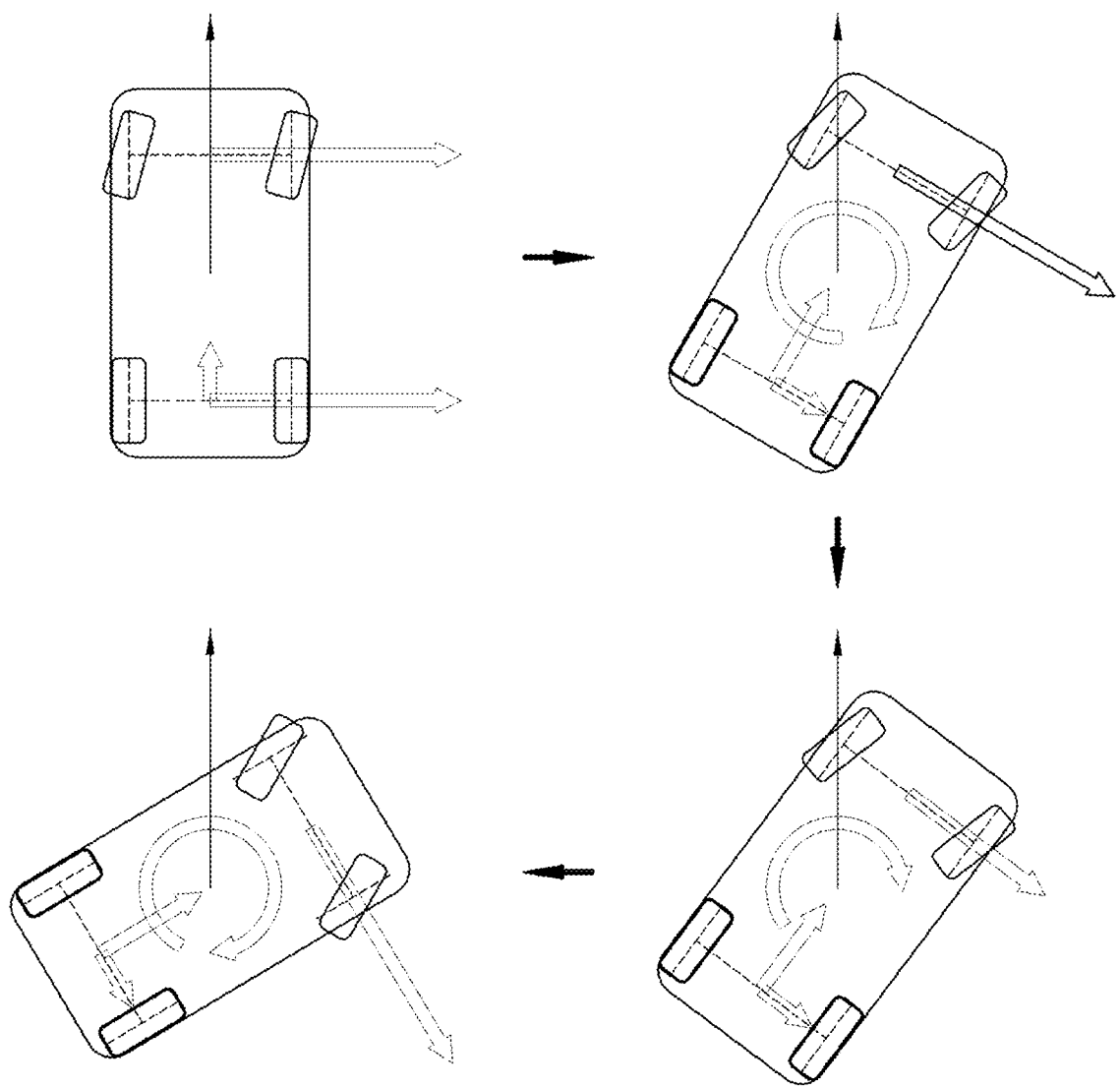
FIG. 7 is a diagram showing a case in which effective countersteering fails.

FIG. 6 is a diagram showing a case in which effective countersteering can be performed in an embodiment of the present disclosure. In contrast, FIG. 7 is a diagram showing a case in which effective countersteering fails. In FIGS. 6 and 7, a vehicle is turning to the right along a curved road, and therefore, the right wheels of the vehicle are turning inner wheels, and the left wheels of the vehicle are turning outer wheels.

In the vehicle shown in FIGS. 6 and 7, the direction and length of an arc-shaped arrow indicate the direction and size of a yaw moment occurring during turning. Further, an arrow in the forward and rearward directions of the vehicle indicates driving force, and the length of the arrow in the forward and rearward directions represents the magnitude of the driving force. In addition, the directions and lengths of arrows in the lateral direction of the vehicle on the front wheels and the rear wheels of the vehicle indicate the directions and lengths of front wheel lateral force and rear wheel lateral force.

Based on the drawing order indicated by arrows in FIGS. 6 and 7, as shown in the first drawing, when the vehicle is turning in a normal state, the vehicle turns with a constant curvature, and therefore, there is no lateral force difference between the front and rear wheels, and a yaw moment of the vehicle does not occur.

Based on the drawing order, the second drawing in FIG. 6 shows a state in which rear wheel slip is induced and oversteer occurs. As shown in this drawing in FIG. 6, because driving force is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 6 shows a state in which additional oversteer is prevented by countersteer, the lateral force of the front wheels is also reduced corresponding to the reduction of the lateral force of the rear wheels by countersteer and thus the yaw moment in the oversteer direction no longer occurs, and therefore, the vehicle may turn while maintaining the current rear wheel slip and lateral slip angle, and may maintain the drift state.

To explain an example of a case in which effective countersteering fails, the second drawing in FIG. 7 shows a state in which rear wheel slip is induced and oversteer occurs, because driving force is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 7 shows an attempt to prevent additional oversteer by countersteer, but although the lateral force of the front wheels is reduced by countersteer, the lateral force of the front wheels is not sufficiently reduced as much as the lateral force of the rear wheels due to the limitation of a front wheel steering angle, and a residual yaw moment in the oversteer direction still exists, causing a larger rear wheel lateral slip angle.

The fourth drawing in FIG. 7 shows a state in which the rear wheel lateral slip angle diverges and the vehicle spins too much, a larger front wheel steering angle is required for appropriate countersteer as the rear wheel lateral slip angle increases, but countersteering is already being performed with the maximum front wheel steering angle, and at this state, the lateral force difference between the front wheels and the rear wheels actually increases, and thereby causes increase in the yaw moment of the vehicle in the oversteer direction and makes it impossible to stabilize the intended posture of the vehicle.

Figure 8:
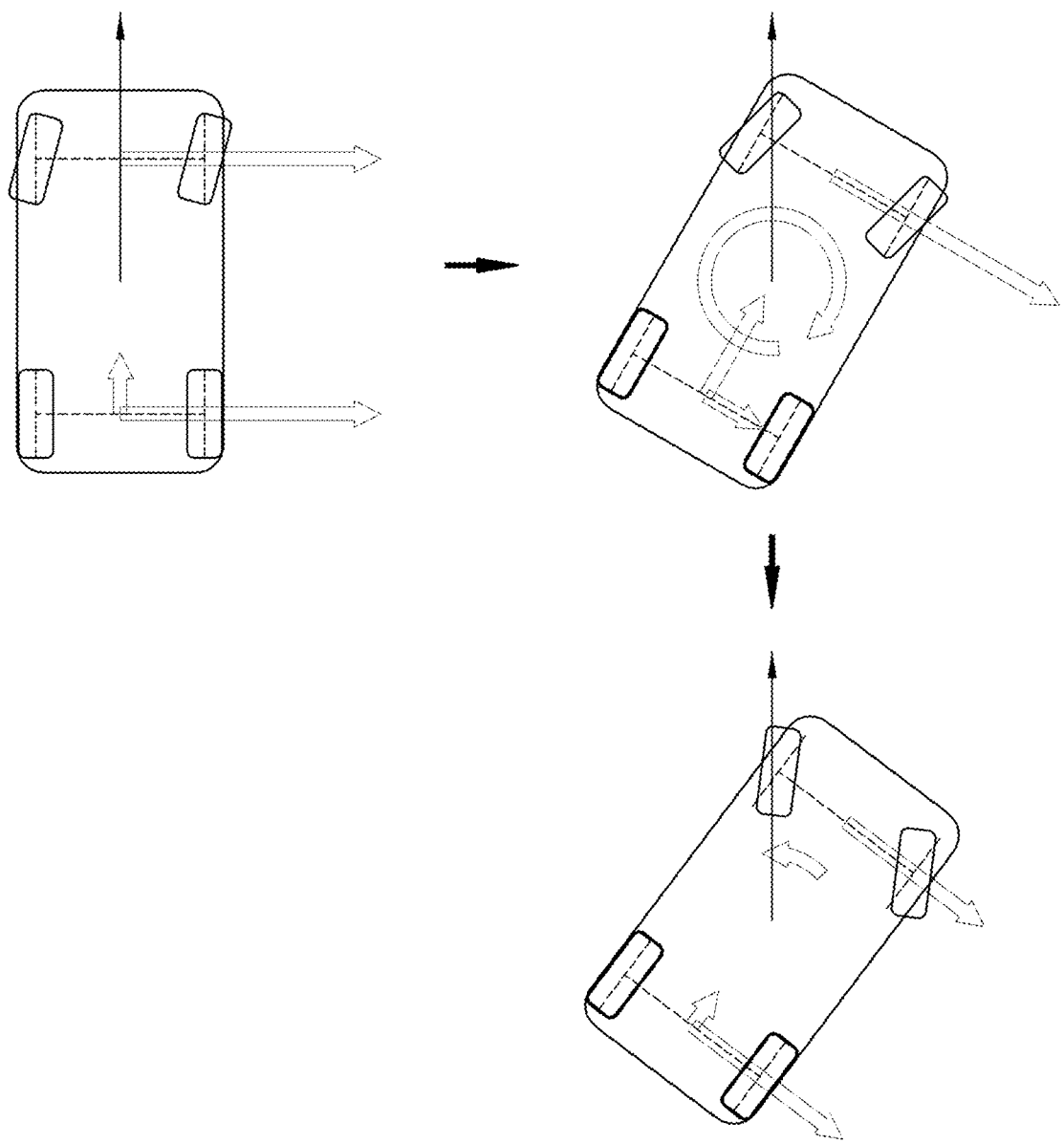
FIG. 8 is a diagram for explaining a state of the vehicle during countersteer expansion control according to an embodiment of the present disclosure.

Next, FIG. 8 is a diagram for explaining a state of the vehicle during countersteer expansion control according to the first embodiment of the present disclosure, showing a case in which the countersteer effect is expanded through rear wheel driving force reduction control. In FIG. 8, the vehicle is turning to the right along a curved road, and therefore, the right wheels of the vehicle are turning inner wheels, and the left wheels of the vehicle are turning outer wheels.

As shown in the first drawing in FIG. 8, when the vehicle is turning in a normal state, the vehicle turns with a constant curvature, and therefore, there is no lateral force difference between the front and rear wheels, and a yaw moment of the vehicle does not occur.

The second drawing in FIG. 8 shows a state in which rear wheel slip is induced and oversteer occurs, because driving force, i.e., motor torque, is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 8 shows a state in which additional oversteer is prevented by countersteer, and thereafter, although the lateral force of the front wheels is reduced by countersteer, the lateral force of the front wheels is not reduced as much as the reduction in the lateral force of the rear wheels due to the limitation of a steering angle.

However, by reducing the driving force of the rear wheel, it is possible to secure the lateral force of the rear wheels, and ultimately the lateral force difference between the front wheels and the rear wheels may be overcome. This creates the countersteer effect, and makes it possible to stabilize the intended posture of the vehicle.

Figure 9:
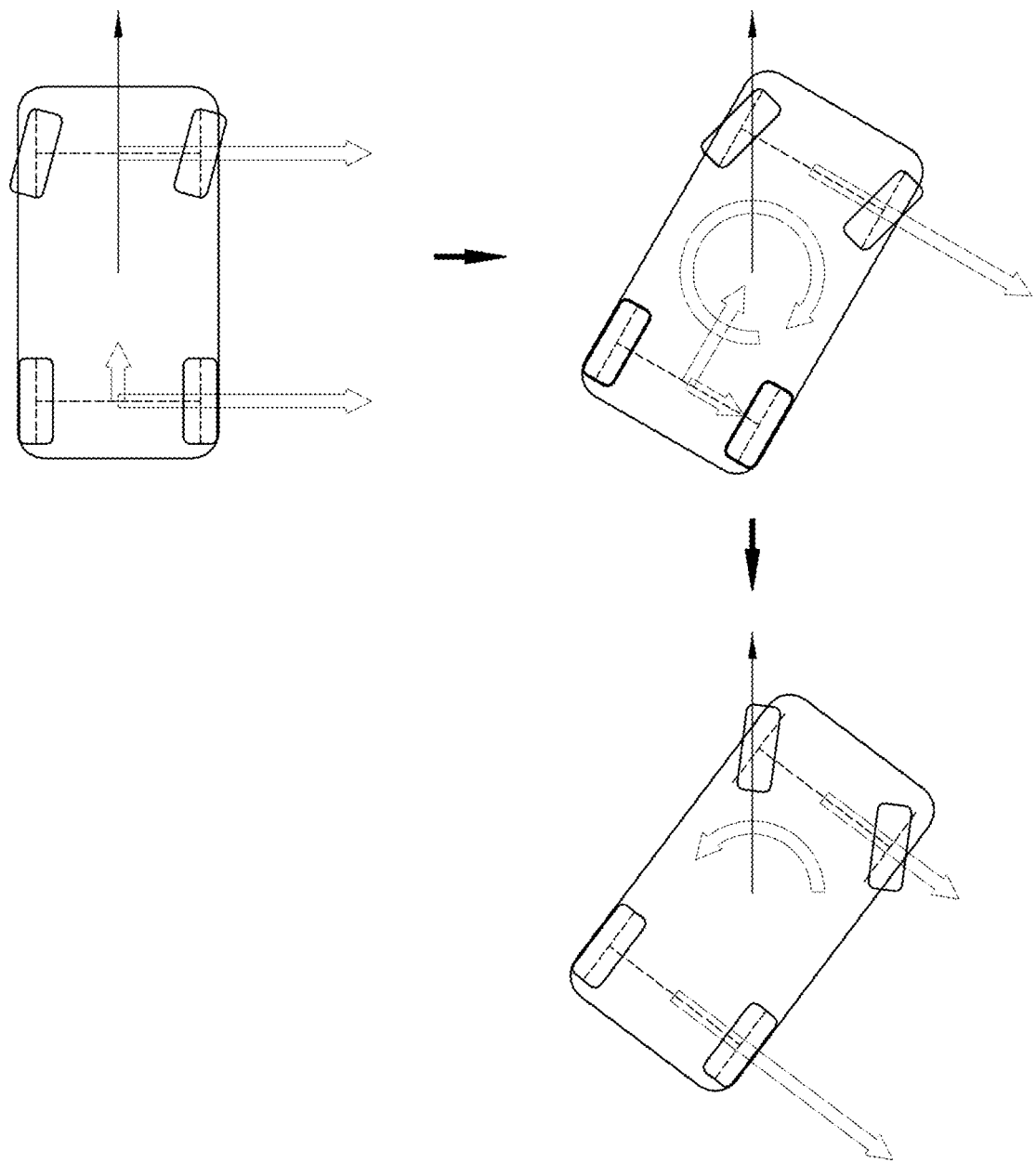
FIG. 9 is a diagram for explaining a state of the vehicle during countersteer expansion control according to an embodiment of the present disclosure.

FIG. 9 is a diagram for explaining a state of the vehicle during countersteer expansion control according to the second embodiment of the present disclosure, showing a case in which the countersteer effect is expanded by resuming rear wheel slip control intervention. In FIG. 9, the vehicle is turning to the right along a curved road, and therefore, the right wheels of the vehicle are turning inner wheels, and the left wheels of the vehicle are turning outer wheels.

As shown in the first drawing in FIG. 9, when the vehicle is turning in a normal state, the vehicle turns with a constant curvature, and therefore, there is no lateral force difference between the front and rear wheels, and a yaw moment of the vehicle does not occur.

The second drawing in FIG. 9 shows a state in which rear wheel slip is induced and oversteer occurs, because driving force, i.e., motor torque, is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 9 shows a state in which additional oversteer is prevented by countersteer, and thereafter, although the lateral force of the front wheels is reduced by countersteer, the lateral force of the front wheels is not reduced as much as the reduction in the lateral force of the rear wheels due to the limitation of a steering angle.

However, because wheel slip control that adjusts the driving force of the rear wheels to reduce rear wheel slip is resumed, the lateral force of the rear wheels is rapidly recovered, and ultimately the lateral force difference between the front wheels and the rear wheels may be overcome. This creates the countersteer effect, and makes it possible to stabilize the intended posture of the vehicle.

Figure 10:
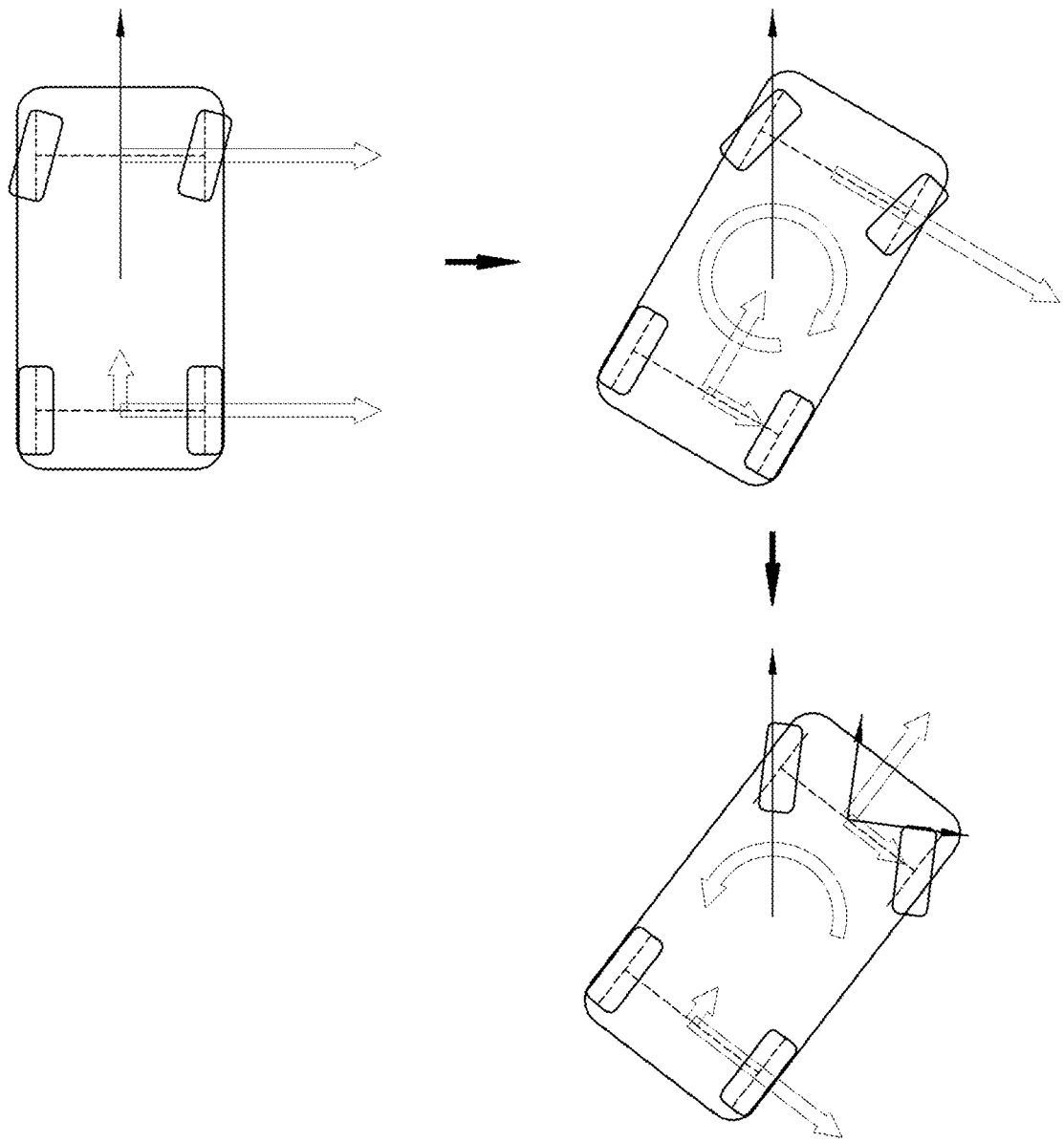
FIG. 10 is a diagram for explaining a state of the vehicle during countersteer expansion control according to an embodiment of the present disclosure.

FIG. 10 is a diagram for explaining a state of the vehicle during countersteer expansion control according to the third embodiment of the present disclosure, showing a case in which the countersteer effect is expanded through distribution of rear wheel driving force to front wheels. In FIG. 10, the vehicle is turning to the right along a curved road, and therefore, the right wheels of the vehicle are turning inner wheels, and the left wheels of the vehicle are turning outer wheels.

As shown in the first drawing in FIG. 10, when the vehicle is turning in a normal state, the vehicle turns with a constant curvature, and therefore, there is no lateral force difference between the front and rear wheels, and a yaw moment of the vehicle does not occur.

The second drawing in FIG. 10 shows a state in which rear wheel slip is induced and oversteer occurs, because driving force, i.e., motor torque, is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 10 shows a state in which additional oversteer is prevented by countersteer, and thereafter, although the lateral force of the front wheels is reduced by countersteer, the lateral force of the front wheels is not reduced as much as the reduction in the lateral force of the rear wheels due to the limitation of a steering angle.

However, in the third embodiment, because the driving force of the rear wheels is applied also to the front wheels, the existing state in which driving force is applied only to the rear wheels, that is, the state in which driving force is applied at a driving force distribution ratio of the front wheels to the rear wheels of 0:100, is changed so that the driving force is also distributed to the front wheels.

Thereby, it is possible to secure the lateral force of the rear wheels compared to the situation in which the driving force distribution ratio of the front wheels to the rear wheels is 0:100, driving force is generated from the front wheels in a direction of the steering angle, and thus, a yaw moment of the vehicle in an understeer direction is generated, and simultaneously, the lateral force of the front wheels is reduced due to generation of the driving force.

All the above-described three effects can act to increase the countersteer effect, thereby being capable of effectively stabilizing the posture of the vehicle. In the third diagram in FIG. 10, a thick arrow represents the vector of acting force from the vehicle's perspective, a thin arrow on the front wheel side represents the vector of acting force from the tire's perspective, and the sums of the vectors from the vehicle's perspective and the tire's perspective are the same.

Figure 11:
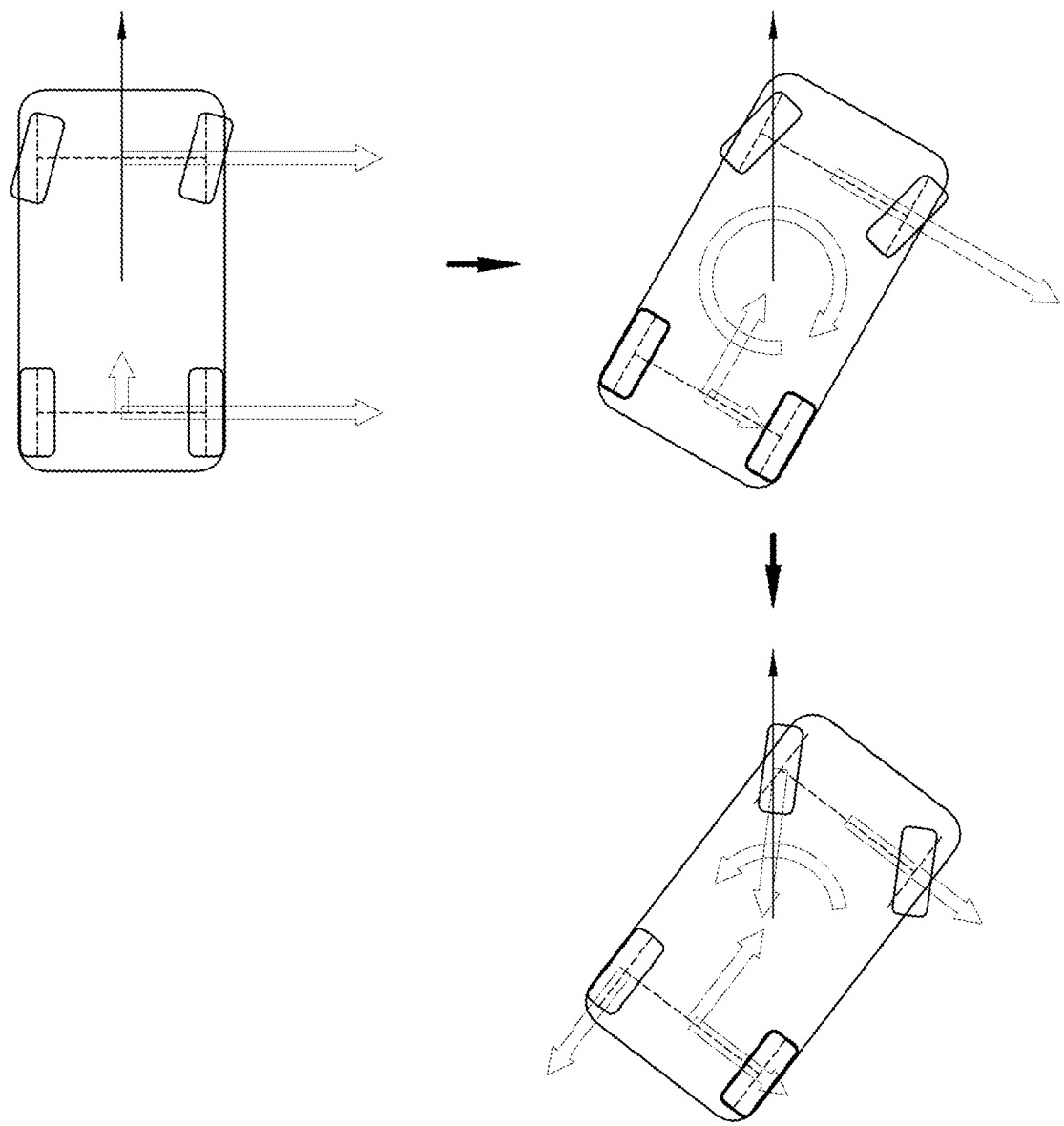
FIG. 11 is a diagram for explaining a state of the vehicle during countersteer expansion control according to an embodiment of the present disclosure.

FIG. 11 is a diagram for explaining a state of the vehicle during countersteer expansion control according to the fourth embodiment of the present disclosure, showing a case in which the countersteer effect is expanded by resuming vehicle stability control through one-sided braking. In FIG. 11, the vehicle is turning to the right along a curved road, and therefore, the right wheels of the vehicle are turning inner wheels, and the left wheels of the vehicle are turning outer wheels.

As shown in the first drawing in FIG. 11, when the vehicle is turning in a normal state, the vehicle turns with a constant curvature, and therefore, there is no lateral force difference between the front and rear wheels, and a yaw moment of the vehicle does not occur.

The second drawing in FIG. 11 shows a state in which rear wheel slip is induced and oversteer occurs, because driving force, i.e., motor torque, is applied only to the rear wheels, the lateral force of the rear wheels is reduced due to occurrence of slip, and a lateral force difference between the front and rear wheels occurs, resulting in a yaw moment of the vehicle in the oversteer direction.

The third drawing in FIG. 11 shows a state in which additional oversteer is prevented by countersteer, and thereafter, although the lateral force of the front wheels is reduced by countersteer, the lateral force of the front wheels is not reduced as much as the reduction in the lateral force of the rear wheels due to the limitation of a steering angle.

However, because one-sided braking control that applies braking force to the turning outer wheels of the vehicle is performed, a yaw moment of the vehicle in an understeer direction is generated, and as a result, the countersteer effect may be expanded, and the posture of the vehicle may be stabilized.

Referring to the third drawing in FIG. 11, arrows pointing toward the rear part of the vehicle are displayed on the front left wheel and the rear left wheel of the vehicle, and these arrows indicate braking force applied to the front left wheel and the rear left wheel. It shows that the braking force is applied to the front left wheel and the rear left wheel that are the turning outer wheels, by the frictional braking device.

Although the example of FIG. 11 shows that the braking force is applied to both the front left wheel and the rear left wheel that are the turning outer wheels, the braking force may be applied only to the rear left wheel among the turning outer wheels.

Applying one-sided braking to the rear wheel among the turning outer wheels of the vehicle not only provides the effect of generating a yaw moment of the vehicle to stabilize the posture of the vehicle, but also provides the effect of securing the lateral force of the rear wheels by conversing slip of the rear wheel among the turning outer wheels that are slipping.

However, applying one-sided braking to the front wheel among the turning outer wheels may have the effect of generating a yaw moment of the vehicle to stabilize the posture of the vehicle, but in this case, the direction of application of a braking force vector follows the steering angle direction and may thus increase only the lateral force of the front wheels in the turning direction.

Because such a vector increases the yaw moment of the vehicle in the oversteer direction, it may be difficult to expect the effect of increasing countersteer, and therefore, a method of applying one-sided braking to a front wheel among turning outer wheels can be performed selectively in consideration of the direction of a yaw moment of the vehicle generated as a result.

Figure 12:
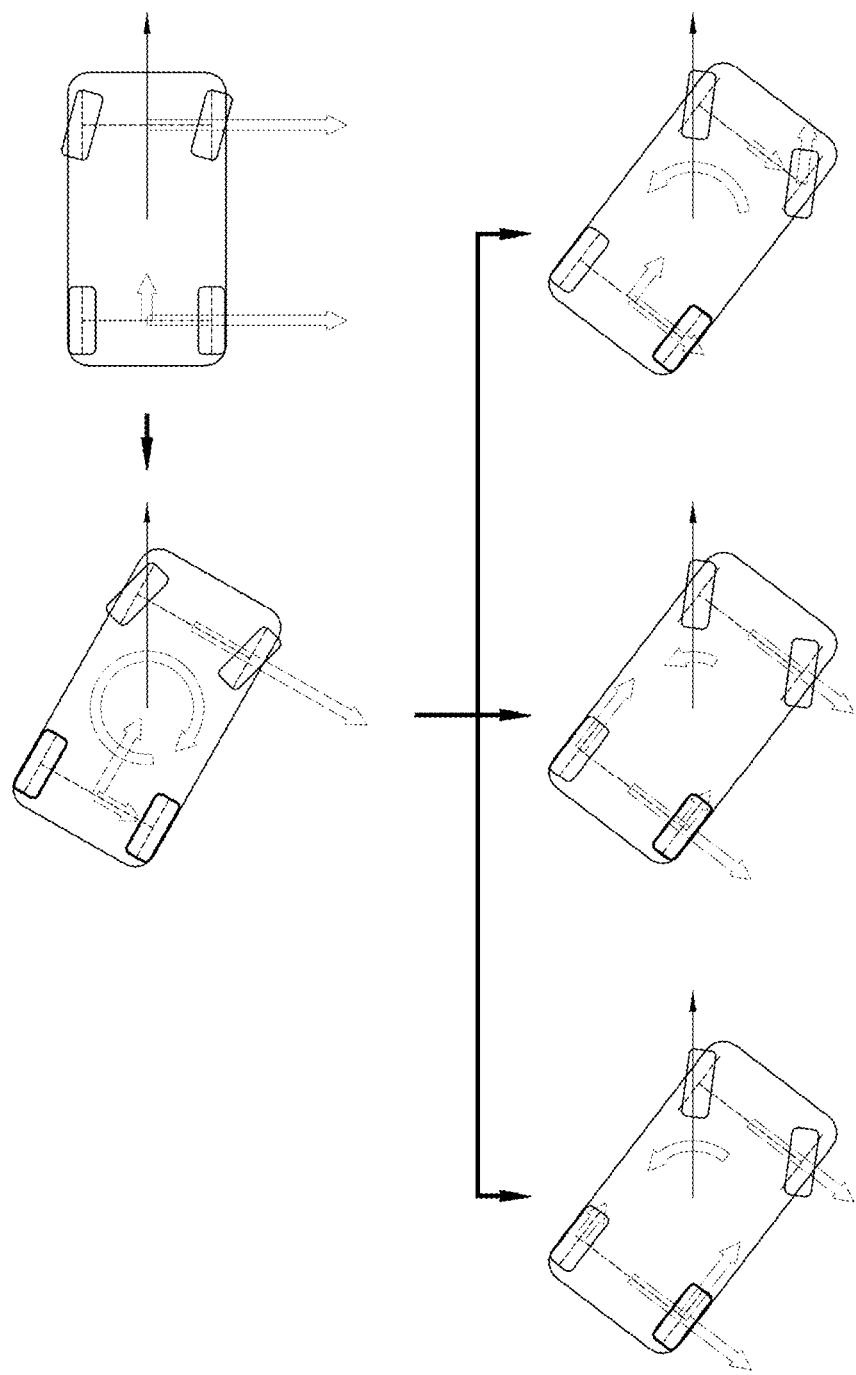
FIG. 12 is a diagram for explaining the state of the vehicle during countersteer expansion control according to an embodiment of the present disclosure.

FIG. 12 is a diagram for explaining a state of the vehicle during countersteer expansion control according to the fifth embodiment of the present disclosure, showing a case in which the countersteer effect is expanded through torque vectoring. In FIG. 12, the vehicle is turning to the right along a curved road, and therefore, the right wheels of the vehicle are turning inner wheels, and the left wheels of the vehicle are turning outer wheels.

As shown in the first drawing in FIG. 12, when the vehicle is turning in a normal state, the vehicle turns with a constant curvature, and therefore, there is no lateral force difference between the front and rear wheels, and a yaw moment of the vehicle does not occur.

The second drawing in FIG. 12 shows a state in which rear wheel slip is induced and oversteer occurs, because driving force, i.e., motor torque, is applied only to the rear wheels, the lateral force of the rear wheels is reduced due to occurrence of slip, and a lateral force difference between the front and rear wheels occurs, resulting in a yaw moment of the vehicle in the oversteer direction.

The third, fourth, and fifth drawings in FIG. 12 show a state in which additional oversteer is prevented through torque vectoring, and thereafter, although the lateral force of the front wheels is reduced by countersteer, the lateral force of the front wheels is not reduced as much as the reduction in the lateral force of the rear wheels due to the limitation of a steering angle.

However, the countersteer effect may be increased using a torque vectoring function. As shown in the uppermost drawing on the right in FIG. 12, it is possible to generate a yaw moment of the vehicle for the countersteer effect by performing front wheel torque vectoring so that driving force is applied only to the front wheel among the turning inner wheels.

In the example of FIG. 12, the turning inner wheels of the vehicle are the front right wheel and the rear right wheel, and driving force is applied only to the front right wheel among the turning inner wheels. Such torque vectoring may be performed in a vehicle equipped with a torque vectoring unit configured to control torque applied to left wheels and torque applied to right wheels differently, such as a torque vectoring apparatus including a torque vectoring motor.

Also or alternatively, as shown in the middle drawing on the right in FIG. 12, rear wheel torque vectoring is performed, but the lateral force of the rear wheels is secured by reducing the driving force of the turning outer wheel among the rear wheels compared to the driving force of the turning inner wheel among the rear wheels through a change in the torque distribution ratio between the left wheels and the right wheels, simply reducing the driving force of the turning outer wheel among the rear wheels compared to in the previous control cycle, or performing slip limit control only on the turning outer wheel among the rear wheels, and thereby, it is possible to generate the yaw moment of the vehicle for the countersteer effect.

In such example case, slip limit control may be control that, because the lateral force of the rear wheels is reduced when slip occurs on any of the rear wheels, reduces an amount of slip on the rear wheel having more slip among the rear wheels by reducing torque distribution to the corresponding rear wheel to alleviate the reduction of the lateral force of the rear wheels. In the present disclosure, slip limit control is a known technology in vehicle control, and a detailed description thereof will thus be omitted.

Also or otherwise, as shown in the lowermost drawing on the right in FIG. 12, rear wheel torque vectoring is performed, but the lateral force of the rear wheels is secured by reducing the driving force of the turning inner wheel among the rear wheels compared to the driving force of the turning outer wheel among the rear wheels through a change in the torque distribution ratio between the left wheels and the right wheels, simply reducing the driving force of the turning inner wheel among the rear wheels compared to in the previous control cycle, or performing slip limit control only on the turning inner wheel among the rear wheels, and thereby, it is possible to generate the yaw moment of the vehicle for the countersteer effect.

An arrow displayed on a front right wheel tire among the front wheels of the vehicle shown in the uppermost drawing on the right in FIG. 12 indicates driving force applied to the tire not longitudinal grip force, and the length of the arrow indicates the magnitude of the driving force.

Likewise, arrows displayed on rear left and rear right wheel tires among the rear wheels of the vehicle shown in the middle and lowermost drawings on the right in FIG. 12 also indicate driving force applied to the corresponding tires, and the lengths of the arrows indicate the magnitudes of the driving force.

In this way, the driving control system and method according to the present disclosure have been described with reference to the example embodiments. According to an embodiment of the present disclosure, a new means that may additionally provide the countersteer effect when an amount of oversteer begins to diverge in the drift mode may be secured, thereby being capable of improving safety problems and ensuring ease in adjustment of the amount of oversteer in the drift mode.

In addition, the driving control system and method according to an embodiment of the present disclosure may reflect a driver's intention in the countersteer effect in the drift mode, and may serve to expand a countersteer operation area.

As can be understood from the above description, a driving control system and method according to an embodiment of the present disclosure may secure a new means that may additionally provide the countersteer effect when an amount of oversteer begins to diverge in the drift mode, thereby being capable of improving safety problems and ensuring ease in adjustment of the amount of oversteer in the drift mode.

The driving control system and method according to an embodiment of the present disclosure may reflect a driver's intention in the countersteer effect in the drift mode, and may serve to expand a countersteer operation area.

The disclosure has been described in detail with reference to example embodiments thereof. However, it can be appreciated by those skilled in the art that changes may be made in these embodiments without departing from the principles and spirit of the disclosure, the scopes of which are defined in the appended claims and their equivalents.

What is claimed is:

1. A driving control method for an electric vehicle, comprising:
    determining whether or not a driving state of the vehicle is a countersteer situation based on vehicle driving information collected from the vehicle;
    determining a countersteer index configured to indicate a degree to which a countersteer effect is increased with respect to a driver's countersteer amount; and
    performing countersteer expansion control to increase the countersteer effect, in response to the determined countersteer index satisfying an expansion requirement after determining that the driving state of the vehicle is the countersteer situation, wherein the countersteer expansion control is control of one of or both of driving force and braking force applied to wheels of the vehicle.

2. The method of claim 1, wherein the countersteer expansion control is one of control configured to stop applying the driving force to rear wheels of the vehicle and control configured to reduce the driving force applied to the rear wheels.

3. The method of claim 1, wherein the countersteer expansion control is configured to resume rear wheel slip control configured to adjust the driving force of rear wheels of the vehicle so as to reduce rear wheel slip.

4. The method of claim 1, wherein the countersteer expansion control is configured to apply a part of the driving force as much as a distribution ratio or all of the driving force to front wheels of the vehicle.

5. The method of claim 1, wherein the countersteer expansion control is configured to apply one-sided braking force to turning outer wheels among front wheels and rear wheels of the vehicle turning along a curved road.

6. The method of claim 1, wherein the countersteer expansion control is configured to apply one-sided braking force to a turning outer wheel among rear wheels of the vehicle turning along a curved road.

7. The method of claim 1, wherein the countersteer expansion control comprises one of:
    torque vectoring control configured to apply the driving force only to a turning inner wheel among front wheels of the vehicle turning along a curved road;
    torque vectoring control configured to reduce the driving force of a turning outer wheel among rear wheels of the vehicle relative to the driving force of a turning inner wheel among the rear wheels through a change in a torque distribution ratio between left wheels and right wheels of the vehicle turning along the curved road, to reduce the driving force of the turning outer wheel among the rear wheels relative to a previous control cycle, or to perform slip limit control only on the turning outer wheel among the rear wheels; and torque vectoring control configured to reduce the driving force of the turning inner wheel among the rear wheels relative to the driving force of the turning outer wheel among the rear wheels through the change in the torque distribution ratio between the left wheels and the right wheels of the vehicle turning along the curved road, to reduce the driving force of the turning inner wheel among the rear wheels relative to the previous control cycle, or to perform slip limit control only on the turning inner wheel among the rear wheels.

8. The method of claim 1, wherein the expansion requirement is set to a condition in which the countersteer index reaches a set maximum value or exceeds a set threshold.

9. The method of claim 1, wherein, in determining the countersteer index, the countersteer index is determined from set data, wherein the set data:
uses a steering angle among the vehicle driving information as an essential input variable; and
uses one of or any combination of a target yaw rate determined from the steering angle, a measured yaw rate detected by a sensor, a yaw rate error which is a difference between the target yaw rate and the measured yaw rate, and a vehicle speed, as an additional input variable, and
wherein the countersteer index is set to a value corresponding to the input variables used.

10. The method of claim 9, wherein the countersteer index is set to a larger value as, among the set data, one of or any combination of an absolute value of the steering angle increases, an absolute value of the target yaw rate increases, an absolute value of the measured yaw rate increases, an absolute value of the yaw rate error increases, and the vehicle speed increases.

11. A driving control system for an electric vehicle, comprising:
a driving information detector configured to detect information for indicating a driving state of the vehicle; and
a control unit configured to perform countersteer expansion control to increase a countersteer effect with respect to a driver's countersteer amount, wherein the control unit is configured to:
determine whether the driving state of the vehicle is a countersteer situation based on vehicle driving information comprising the information detected by the driving information detector,
determine a countersteer index configured to indicate a degree to which the countersteer effect is increased with respect to the driver's countersteer amount, and
perform the countersteer expansion control configured to control one of or both of driving force and braking force applied to wheels of the vehicle to increase the countersteer effect, in response to the determined countersteer index satisfying an expansion requirement after determining that the driving state of the vehicle is the countersteer situation.

12. The driving control system of claim 11, wherein the countersteer expansion control is one of control configured to stop applying the driving force to rear wheels and control configured to reduce the driving force applied to the rear wheels.

13. The driving control system of claim 11, wherein the countersteer expansion control is configured to resume rear wheel slip control configured to adjust the driving force of rear wheels of the vehicle so as to reduce rear wheel slip.

14. The driving control system of claim 11, wherein the countersteer expansion control is configured to apply a part of the driving force as much as a distribution ratio or all of the driving force to front wheels of the vehicle.

15. The driving control system of claim 11, wherein the countersteer expansion control is configured to apply one-sided braking force to turning outer wheels among front wheels and rear wheels of the vehicle turning along a curved road.

16. The driving control system of claim 11, wherein the countersteer expansion control is configured to apply one-sided braking force to a turning outer wheel among rear wheels of the vehicle turning along a curved road.

17. The driving control system of claim 11, wherein the countersteer expansion control comprises one of:
torque vectoring control configured to apply the driving force only to a turning inner wheel among front wheels of the vehicle turning along a curved road;
torque vectoring control configured to reduce the driving force of a turning outer wheel among rear wheels of the vehicle compared to the driving force of a turning inner wheel among the rear wheels through a change in a torque distribution ratio between left wheels and right wheels of the vehicle turning along the curved road, to reduce the driving force of the turning outer wheel among the rear wheels compared to a previous control cycle, or to perform slip limit control only on the turning outer wheel among the rear wheels; and
torque vectoring control configured to reduce the driving force of the turning inner wheel among the rear wheels compared to the driving force of the turning outer wheel among the rear wheels through the change in the torque distribution ratio between the left wheels and the right wheels of the vehicle turning along the curved road, to reduce the driving force of the turning inner wheel among the rear wheels compared to the previous control cycle, or to perform slip limit control only on the turning inner wheel among the rear wheels.

18. The driving control system of claim 11, wherein the expansion requirement is set to a condition in which the countersteer index reaches a set maximum value or exceeds a set threshold.

19. The driving control system of claim 11, wherein the countersteer index is determined from set data by the control unit,
wherein the set data:
uses a steering angle among the vehicle driving information as an essential input variable; and
uses at least one of a target yaw rate determined from the steering angle, a measured yaw rate detected by a sensor, a yaw rate error which is a difference between the target yaw rate and the measured yaw rate, or a vehicle speed, as an additional input variable,
wherein the countersteer index is set to a value corresponding to the input variables used.

20. The driving control system of claim 19, wherein the countersteer index is set to a larger value as, among the set data, an absolute value of the steering angle increases, an absolute value of the target yaw rate increases, an absolute value of the measured yaw rate increases, an absolute value of the yaw rate error increases, and the vehicle speed increases.

* * * * *